(12) United States Patent
Kai et al.

(10) Patent No.: US 8,119,043 B2
(45) Date of Patent: *Feb. 21, 2012

(54) METHOD OF MAKING MASTER FOR MANUFACTURING OPTICAL DISC AND METHOD OF MANUFACTURING OPTICAL DISC

(75) Inventors: Shinichi Kai, Tokyo (JP); Katsuhisa Aratani, Chiba (JP); Akira Kouchiyama, Kanagawa (JP); Kenzo Nakagawa, Kanagawa (JP); Yoshihiro Takemoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1298 days.

This patent is subject to a terminal disclaimer.

(21) Appl. No.: 10/505,455

(22) PCT Filed: Dec. 24, 2003

(86) PCT No.: PCT/JP03/16620
§ 371 (c)(1),
(2), (4) Date: Mar. 21, 2005

(87) PCT Pub. No.: WO2004/064057
PCT Pub. Date: Jul. 29, 2004

(65) Prior Publication Data
US 2005/0161842 A1    Jul. 28, 2005

(30) Foreign Application Priority Data

Jan. 9, 2003  (JP) .................................. 2003-003217

(51) Int. Cl.
*B29D 11/00* (2006.01)
*B29D 17/00* (2006.01)
(52) U.S. Cl. ...................... 264/1.21; 264/1.33; 264/1.37; 264/2.5; 264/400; 425/810
(58) Field of Classification Search .................. 264/1.1, 264/1.33, 1.37, 2.5, 482, 1.21, 400; 369/103, 369/110, 275.3; 425/810
See application file for complete search history.

(56) References Cited

U.S. PATENT DOCUMENTS
4,615,969 A    10/1986  Strand
(Continued)

FOREIGN PATENT DOCUMENTS
EP            0 500 044 A2    8/1992
(Continued)

*Primary Examiner* — Mathieu D. Vargot
(74) *Attorney, Agent, or Firm* — Oblon, Spivak, McClelland, Maier & Neustadt, L.L.P.

(57) ABSTRACT

The method of the present invention includes: an exposing process in which an inorganic resist layer 101 formed on a substrate 100 is irradiated with recording laser light modulated by an information signal corresponding to an information signal of an information concave and convex pattern formed on an optical disc to form an exposed pattern corresponding to the information concave and convex pattern on the optical disc, and after the above process a development process in which development processing is performed on the inorganic resist layer to form a concave and convex pattern corresponding to the information concave and convex pattern of the inorganic resist layer; in the above exposing process, after a trial exposure is performed on a non-recording area of the above resist layer, the exposed portion is irradiated with evaluation laser light and a recording signal characteristic of the above resist layer is evaluated from the reflected light to determine based on the evaluation result an optimum focus position of recording laser light which is later performed; and accordingly the recording signal characteristic (jitter value) of the optical disc is predicted and evaluated in the exposing process from the recording characteristic of the exposed portion on the resist to appropriately adjust an exposure focusing position based on the evaluation result and thus, a master having an appropriate concave and convex pattern and consequently an optical disc having an excellent characteristic can be manufactured.

4 Claims, 6 Drawing Sheets

U.S. PATENT DOCUMENTS

| | | | |
|---|---|---|---|
| 5,691,091 A * | 11/1997 | Chaiken et al. | 430/19 |
| 5,726,756 A * | 3/1998 | Aki et al. | 356/630 |
| 5,851,251 A | 12/1998 | Kondo et al. | |
| 6,120,870 A | 9/2000 | Nebashi et al. | |
| 7,344,822 B2 * | 3/2008 | Kouchiyama et al. | 430/270.1 |
| 2003/0067863 A1 | 4/2003 | Takeda et al. | |
| 2003/0133006 A1 | 7/2003 | Sako et al. | |
| 2004/0170916 A1 * | 9/2004 | Kouchiyama et al. | 430/270.1 |

FOREIGN PATENT DOCUMENTS

| | | | |
|---|---|---|---|
| JP | 53-009101 | | 1/1978 |
| JP | 57-203233 | | 12/1982 |
| JP | 60-254432 | | 12/1985 |
| JP | 04-356744 | | 12/1992 |
| JP | 08-124226 | | 5/1996 |
| JP | 08-329534 | | 12/1996 |
| JP | 09-152716 | | 6/1997 |
| JP | 2000-311357 | | 11/2000 |
| JP | 2001-195791 | | 7/2001 |
| JP | 2001-307332 | | 11/2001 |
| JP | 2002-288853 | | 10/2002 |
| JP | 2002-342975 | | 11/2002 |
| JP | 2003-315988 | * | 11/2003 |
| WO | WO 01/22413 A1 | | 3/2001 |
| WO | WO 02/49009 | * | 6/2002 |
| WO | WO 02/50820 A2 | | 6/2002 |

* cited by examiner

METHOD OF MAKING MASTER FOR MANUFACTURING OPTICAL DISC AND METHOD OF MANUFACTURING OPTICAL DISC

TECHNICAL FIELD

The present invention relates to a method of making a master for manufacturing an optical disc and a method of manufacturing an optical disc, in which a stamper is made by transcription to form an optical disc substrate having grooves for tracking, addressing and the like and having a concave and convex pattern such as a pit for recording data by injection molding or a 2P (Photo Polymerization) method, for example, when manufacturing the optical disc, and in particular to a method in which by adjusting an exposure focusing at a time of making the master, the master for obtaining an excellent optical disc and accordingly the optical disc having excellent characteristics can be manufactured.

BACKGROUND ART

In recent years, an optical disc such as a DVD (Digital Versatile Disc) has been used in a wide range of field as a recording medium.

This optical disc has a structure, in which a minute information concave and convex pattern such as grooves to obtain various information signals, for example, an address signal, a tracking signal, and the like and pits as a recording portion for a data information signal is formed on an optically transparent optical disc substrate made of polycarbonate or the like; a reflective film formed of a thin metal film of aluminum or the like is formed thereon; and further, a protective film is formed on the reflective film.

This optical disc is manufactured through a manufacturing process shown in FIGS. 6A to 6J (for example, refer to paragraphs from [0002] to [0006] of the Japanese Laid-open Patent Application No. 2001-195791).

Figure 6A:
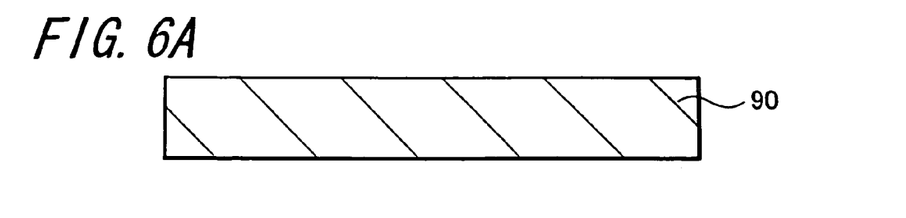
FIGS. 6A through 6J are manufacturing process diagrams of a conventional optical disc.
Figure 6B:
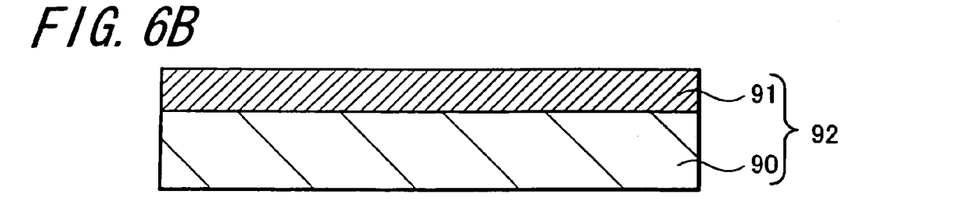

First, a glass substrate 90 having a planarized surface is prepared (FIG. 6A), and a resist layer 91 composed of a photosensitive photo-resist (organic resist) is uniformly formed on the glass substrate 90 to constitute a resist substrate 92 (FIG. 6B).

Figure 6C:
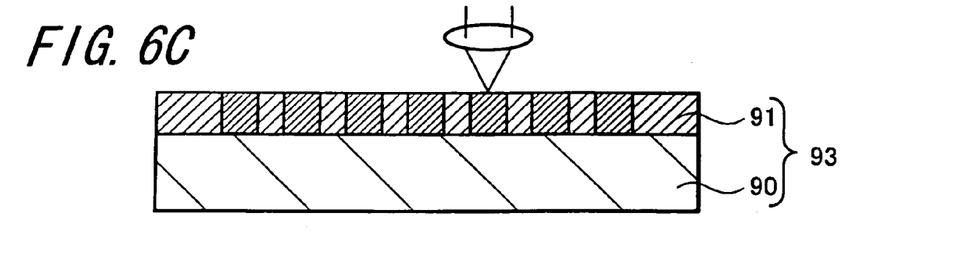

Then, while relatively scanning recording laser light, for example, in a spiral form from an inner circumference portion to an outer circumference portion of the substrate 90 or from the outer circumference portion to the inner circumference portion thereof on the resist layer 91 of the resist substrate 92, the recording laser light that is ON-OFF controlled corresponding to an information signal pattern is irradiated to form an exposed master 93 to which a pattern exposure, that is, an exposure corresponding to the information concave and convex pattern of an optical disc substrate to be ultimately obtained is performed on the resist layer 91 (FIG. 6C).

Figure 6D:
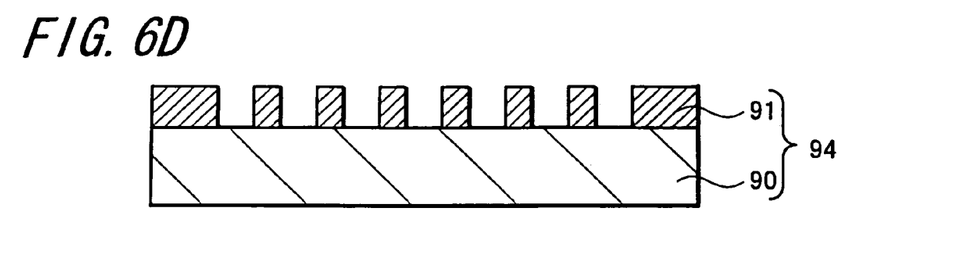

Then, the resist layer 91 is developed to obtain a master 94 in which a predetermined concave and convex pattern is formed (FIG. 6D).

Figure 6E:
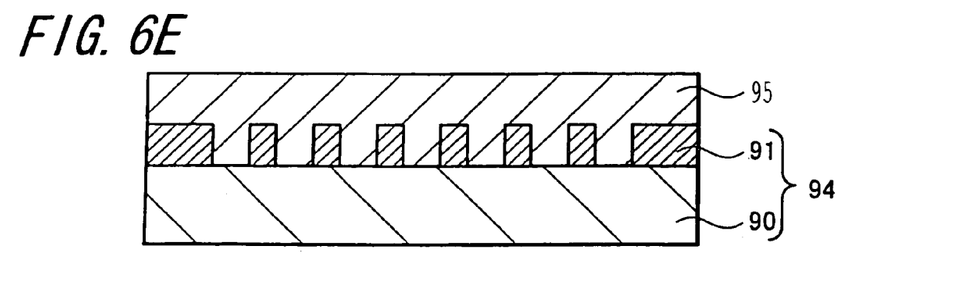
Figure 6F:
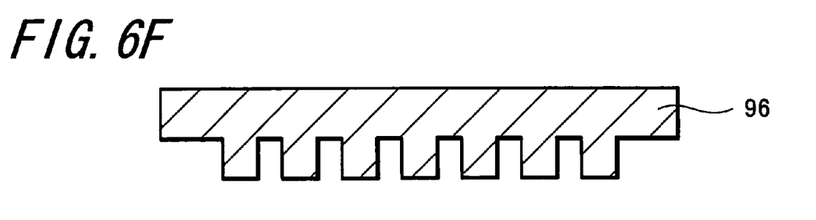
Figure 6G:
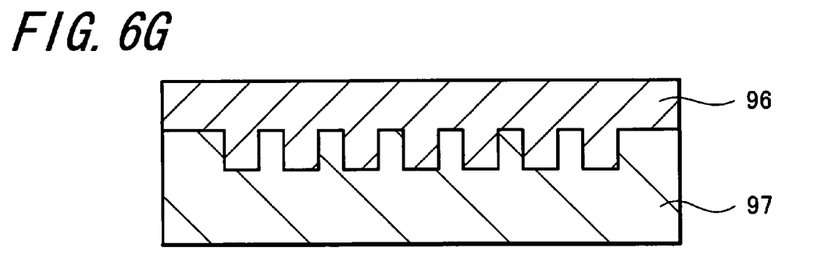

Next, a nickel metal plating layer 95 is formed on the plane of the concave and convex pattern of the master 94 by an electroforming method (FIG. 6E). This plating layer 95 is exfoliated from the master 94 and a predetermined processing is performed to obtain a molding stamper 96 onto which the concave and convex pattern of the master 94 is transcribed (FIG. 6F).

Figure 6H:
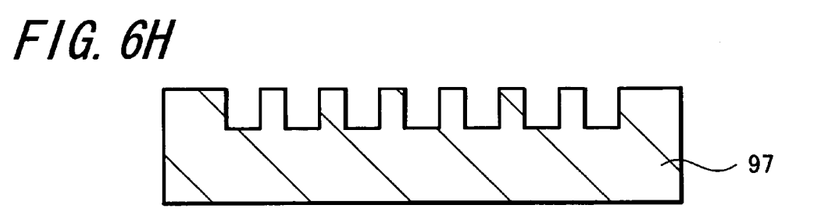
Figure 6I:
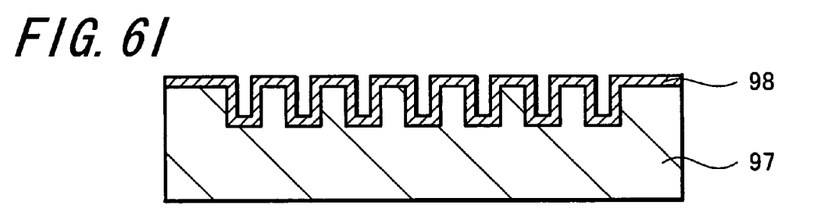

The injection molding is carried out using this molding stamper 96 (FIG. 6G) to mold a resin optical disc substrate 97 made of polycarbonate that is a thermoplastic resin material (FIG. 6H).

Figure 6J:
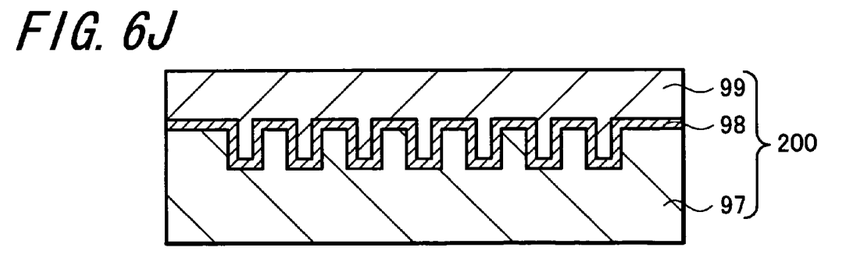

Subsequently, a reflective film 98 (FIG. 6I) and a protective film 99 made of aluminum alloy are formed on the concave and convex plane of the optical disc substrate 97 to obtain an optical disc 200 (FIG. 6J).

The optical disc manufactured as described above becomes a product after a quality inspection is performed, in which a jitter value (Jitter) is one of the items for measuring the quality. The jitter value shows fluctuation of RF signal in the direction of time axis when signal reproduction is performed and is an important item serving as a quality index of the reproduced signal of an optical disc.

Further, since the jitter is affected by a fluctuation in dimensions of a concave portion (pit) in the concave and convex pattern formed in the optical disc, the value thereof has become a more important control item under the circumstances where the concave and convex pattern becomes minute due to an increase in capacity of optical discs of late.

Accordingly, it becomes important to adjust the shape and dimensions of an exposing spot when making the exposed master which determines the shape and dimensions of the pit. However, since there is a difference in judgment made by individuals whether this exposing spot is good or not good, dispersion occurs in adjusting an exposure focusing at the time of exposure, which has become a cause of dispersion in signal characteristics of the optical disc as an ultimate product.

In addition, since this focus adjustment needs a long optical system and a CCD (Charge Coupled Device) camera for observing reflected light at a confocal point as later described, an optical system structure in an exposing apparatus has become complicated.

Moreover, since the jitter value is obtained from the RF signal pattern at the time of signal reproduction and it is difficult to measure this value from a latent image of the resist layer after exposure, the measurement thereof has only been possible with respect to the optical disc at a stage of an ultimate product (FIG. 6J) after performing the above described manufacturing process.

Therefore, in case that an adjustment of an exposure focusing position was inappropriate, a series of labors and manufacturing time spent until then and also a product became useless.

As described above, when a defect resulting from a manufacturing condition of an exposing process occurs, its loss is unmistakably large.

Further, since it is only possible to take a method of feeding back the measurement result of the jitter value obtained after the above described final process to the manufacturing process, a prompt correction of the manufacturing condition has not been possible, either.

Particularly, with respect to the correction of the manufacturing condition in the exposing process, a long period of time has been required from the time when the relevant lot went through the exposing process until the time when the exposure condition corrected in accordance with feedback information from the final process of the lot can be reflected. Therefore, when a defect of product occurs due to the manufacturing condition of the exposing process, it also takes a long period of time to investigate the cause of defect and furthermore, it takes a huge amount of time before the correction of conditions is reflected in manufacturing, which has also resulted in an obstruction to the whole productivity and decrease in the yield.

Due to the above, in the above described manufacturing process an appropriate manufacturing condition of each process is set such that the fluctuation in dimensions of an information concave and convex pattern of the optical disc, particularly of the pit, can be controlled as much as possible and the jitter value is managed to fall within a certain range.

Particularly, the above described exposing process is a process which greatly affects the formation of a pit, and especially among other things, a strict control to maintain the distance between an objective lens of the exposing apparatus and the surface of the resist layer of the resist substrate (hereinafter, referred to as an exposure focusing position) is required, because exposure must be performed such that the recording laser light is focused on the surface of the resist layer of the resist substrate.

Conventionally, the adjustment of the focus position in the exposing process is performed using a method in which a position (height) of the resist substrate is fixed; light reflected from the resist substrate is visually observed at such a position as a focal point of the objective lens becomes a confocal point; and the height position of the objective lens from the surface of the resist layer of the resist substrate is adjusted by operating a focus actuator which performs a focus adjustment such that its spot shape can become the best.

DISCLOSURE OF THE INVENTION

The present invention provides a method of making a master for manufacturing an optical disc and a method of manufacturing the optical disc, in which in an exposing process a recording signal characteristic (jitter value) of the optical disc is predicted and evaluated from the recording signal characteristic of an exposed portion on a resist, and based on the evaluation result an exposure focusing position can be appropriately adjusted, so that the above described various problems can be solved.

Specifically, using a phenomenon in which when adopting an exposing method of exposing a resist layer made of an inorganic resist material with laser light or the like to change a chemical state of the resist layer, a reflectance of light (amount of reflected light) changes correspondingly with the change of the chemical state of the inorganic resist material caused by this exposure, and paying attention to and studying a diffraction phenomenon thereof, the inventors of the present invention attained the present invention.

A method of making a master for manufacturing an optical disc according to the present invention includes: an exposing process in which an inorganic resist layer formed on a substrate is irradiated with recording laser light modulated by an information signal corresponding to an information signal of an information concave and convex pattern formed on the above optical disc to form an exposed pattern corresponding to the above information concave and convex pattern of the above optical disc, and a development process in which development processing is performed thereafter on the above inorganic resist layer to form a concave and convex pattern corresponding to the above information concave and convex pattern of the above inorganic resist layer; in which after a trial exposure is performed on a non-recording area of the above resist layer, laser light for evaluation is irradiated on the exposed portion; a recording signal characteristic of the above resist layer is evaluated from the reflected light; and based on the evaluation result an exposure focusing position is adjusted to determine an optimum focal position of laser light for recording which is later performed.

Further, a method of manufacturing an optical disc according to the present invention includes the processes of: making a master for manufacturing the optical disc; making a stamper for manufacturing the optical disc from the above master by transcription; forming the optical disc in which an optical disc substrate is made by transcription using the above stamper; forming a reflective film on the optical disc substrate; and forming a protective film; further the above described production process of the master has: an exposing process in which the inorganic resist layer formed on the substrate is irradiated with recording laser light modulated by an information signal corresponding to the information signal of the information concave and convex pattern formed on the above optical disc to form an exposed pattern corresponding to the above information concave and convex pattern of the above optical disc; and a development process in which development processing is performed thereafter on the above inorganic resist layer to form a concave and convex pattern corresponding to the above information concave and convex pattern on the above stated inorganic resist layer; and in the above described exposing process: after a trial exposure is performed on a non-recording area of the above resist layer, laser light for evaluation is irradiated on the exposed portion; a recording signal characteristic of the above resist layer is evaluated from the reflected light; and based on the evaluation result an exposure focusing position is adjusted to determine an optimum focal position of laser light for recording which is later performed.

Further, in the above described method of making the master for manufacturing the optical disc and method of manufacturing the optical disc according to the present invention, the inorganic resist layer is a resist layer containing incomplete oxide of transition metals.

Further, in the above described method of making the master for manufacturing the optical disc and method of manufacturing the optical disc according to the present invention, an area irradiated with the above described laser light for evaluation is an area other than an area irradiated with the above recording laser light.

According to the above described method of the present invention, since the recording signal characteristic of the exposed portion by the trial exposure before the exposure processing is measured at a stage of the exposing process, whether a final product produced under the exposure condition is good or not good can be judged based on the result of this measurement. Therefore, it becomes possible to set the appropriate exposure focusing position immediately from this result to an area intended to be exposed for recording.

Hereupon, the evaluation of the recording signal characteristic of the resist layer means an evaluation of a relationship between the recording signal characteristic of the exposed master for the optical disc, that is, the jitter value of a radio frequency (RF) signal pattern and the exposure focusing position, and it is desirable to select the exposure focusing position where the jitter value becomes minimum. That is because the recording signal characteristic of the resist layer has a relationship which corresponds to the recording signal characteristic (jitter value) of the optical disc.

Moreover, with respect to the RF signal pattern of the exposed master for the optical disc, since a modulation degree indicating an extent of diffraction of the reflected light of the exposed portion is also correlated with the recording signal characteristic (jitter value) of the optical disc, the exposure focusing position where the modulation degree thereof becomes maximum may be selected.

It should be noted that, when a resist substrate using an organic resist material made of a conventional photosensitive resist material is exposed to perform a signal recording, the present invention can not be applied to since no difference occurs in the amount of reflected light between an area of a resist layer being exposed and an area thereof without being exposed, and what kind of signal is recorded cannot be confirmed at the stage of exposure.

Further, according to the present invention, since the trial exposure is performed on the area other than the area irradiated with the recording laser light, the final product manufactured under the condition of the exposure focusing position can be judged whether good or not good in the area where the quality of the optical disc is not affected at the stage immediately before performing the exposure processing in the exposing process, and therefore, an evaluation can again be performed immediately even if the result of judgment turns to be NG (No Good) and the exposure focusing position can be corrected.

Therefore, according to the present invention, it is possible to form an appropriate exposed pattern and consequently to make a master for manufacturing an optical disc which has an appropriate concave and convex pattern, whereby the optical disc in which the jitter is improved can be efficiently manufactured.

BEST MODE FOR CARRYING OUT THE INVENTION

An embodiment of a method of making a master for manufacturing an optical disc and a method of manufacturing the optical disc according to the present invention will be explained.

First, a method of manufacturing an optical disc using an inorganic resist material will be explained, which becomes a premise for a method for adjusting an exposure focusing position thereof. As one of the manufacturing method, there is a method in which after forming on a substrate a resist layer made of a resist material containing an incomplete oxide of a transition metal that has a content of oxygen smaller than that of a stoichiometric composition corresponding to the number of valences which the above transition metal can have, the resist layer is selectively exposed to correspond to a recording signal pattern and is developed to form a predetermined concave and convex pattern.

Hereunder, a manufacturing process thereof is schematically explained by referring to process diagrams of FIGS. 1A through 1J.

Figure 1A:
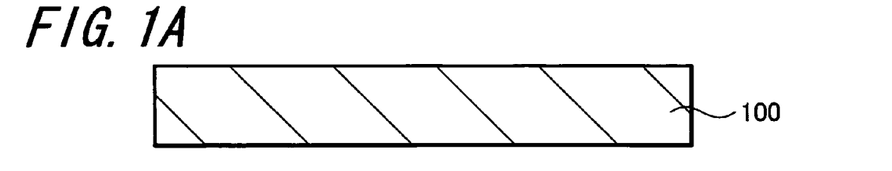
FIGS. 1A through 1J are manufacturing process diagrams of an optical disc to which a method for adjusting an exposure focusing position according to the present invention is applied.

First, a substrate 100 constituting a master is prepared (FIG. 1A).

Figure 1B:
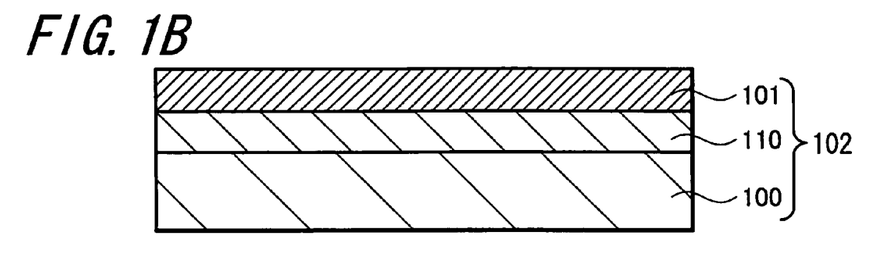

A resist layer 101 made of a resist material of a predetermined inorganic system is uniformly formed on the substrate 100 by a sputtering method. In this case, a predetermined intermediate layer 110 may be formed between the substrate 100 and a resist layer 101 in order to improve a recording sensitivity of the resist layer 101 (FIG. 1B). Although a film thickness of the resist layer 101 can be set arbitrarily, it is desirable to be set within the range of 10 nm to 120 nm. A resist substrate 102, in which the resist layer 101 is formed on the substrate 100, is obtained in this manner.

Figure 1C:
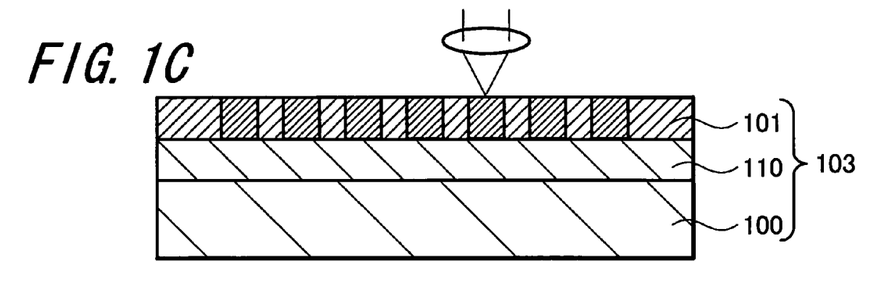

Subsequently, using an exposing apparatus provided with a known laser apparatus, an exposing process of selective exposure is performed on the resist layer 101 with recording laser light, in which on-off modulation is performed by an information signal corresponding to an information concave and convex pattern in an aimed optical disc. Accordingly, an exposed master 103, to which an exposure of a required pattern is formed, is made (FIG. 1C).

At this time, the incomplete oxide of the transition metal constituting the resist material of the resist layer 101 absorbs an ultraviolet ray or visible light, and chemical property thereof changes by irradiating the ultraviolet ray or visible light.

Figure 1D:
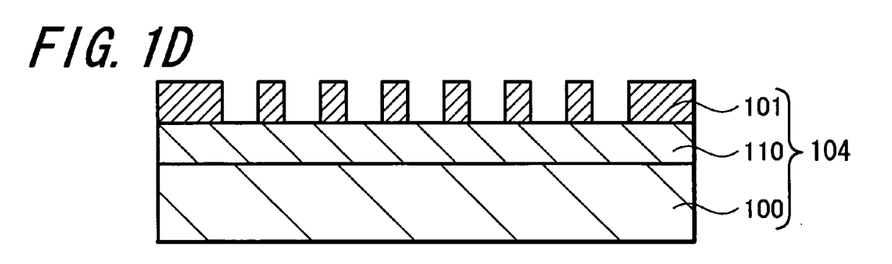

Next, a master 104, in which a predetermined concave and convex pattern is formed by performing a development process to develop the resist layer 101, is obtained (FIG. 1D). In this case, when an exposed portion and a non-exposed portion are formed in the exposing process, there occurs a difference in etching speed, that is, a so-called selection ratio, between both portions, with respect to acid or alkali aqueous solution though it is the inorganic resist, so that development can be performed by the acid or alkali aqueous solution.

Figure 1E:
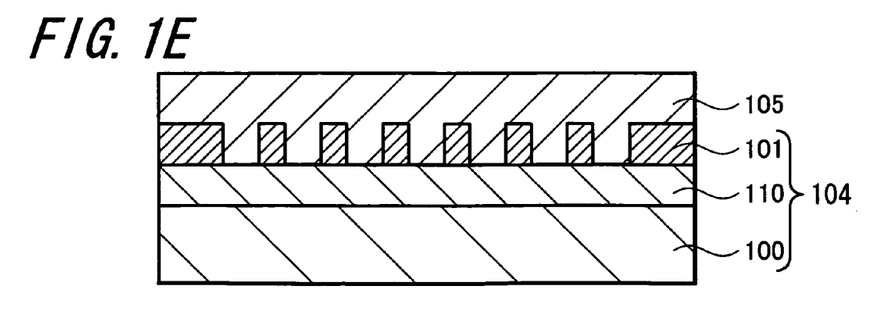

Then, a nickel metal plating layer 105 is formed on the surface of the concave and convex pattern of the master 104 by an electroforming method (FIG. 1E).

Figure 1F:
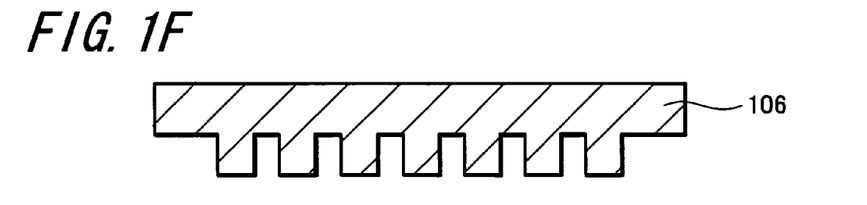

The plating layer 105 is exfoliated from the master 104, and a predetermined processing is performed to obtain a molding stamper 106 to which the concave and convex pattern of the master 104 is transcribed (FIG. 1F).

Figure 1G:
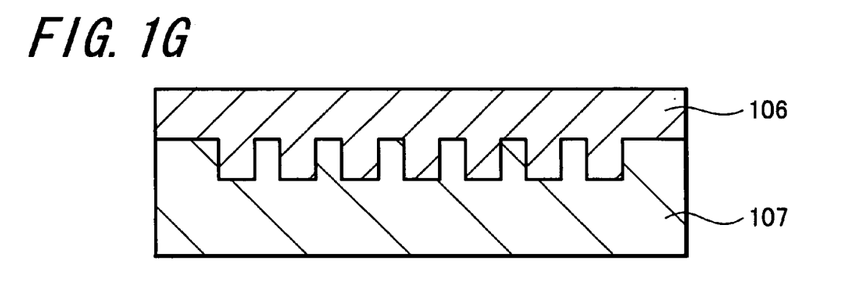
Figure 1H:
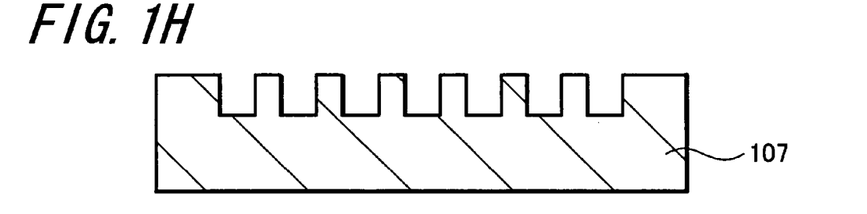

Using this molding stamper 106, a resin optical disc substrate 107 made of a polycarbonate of thermoplastic resin is formed by, for example, an injection molding method or a 2P method (FIGS. 1G and 1H).

Figure 1I:
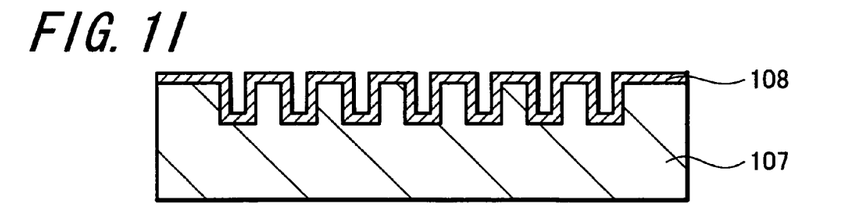

Subsequently, a reflective film 108 made of, for example, an aluminum alloy is formed on the concave and convex plane of the optical disc substrate 107 by deposition or the like (FIG. 1I).

Figure 1J:
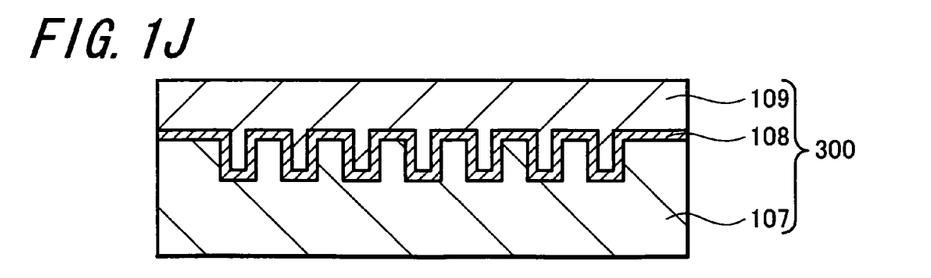

Further, a protective film 109 is formed on the reflective film 108. Thus, an optical disc 300 is obtained (FIG. 1J).

[Resist Material]

A resist material employed as the above described resist layer 101 is an incomplete oxide of transition metals. Hereupon, incomplete oxide of transition metals means a compound in which an oxygen content is shifted in the direction of having less than that of a stoichiometric composition corresponding to the number of valences which the transition metal can take, in other words the incomplete oxide is defined as the compound in which the oxygen content of the transition metal is less than that of the stoichiometric composition corresponding to the number of valences which the above transition metal can take.

Accordingly, the resist layer 102 made of the above material can absorb an optical energy of ultraviolet ray or visible light, which is transmitted in the state of complete oxide of the transition metal, so that recording a signal pattern can be performed using a change in chemical state of the inorganic resist material.

As specific examples of the transition metals constituting the resist material, Ti, V, Cr, Mn, Fe, Nb, Cu, Ni, Co, Mo, Ta, W, Zr, Ru, Ag and the like are provided. Among them, it is desirable to use Mo, W, Cr, Fe and Nb, and particularly it is desirable to use Mo and W from a view point that a conspicuous chemical change can be obtained by applying ultraviolet ray or visible light.

[Exposing Process to the Resist Layer]

Hereinafter, the exposing process of the resist layer in the above described manufacturing process, to which the present invention is directly related, is explained in detail.

Figure 2:
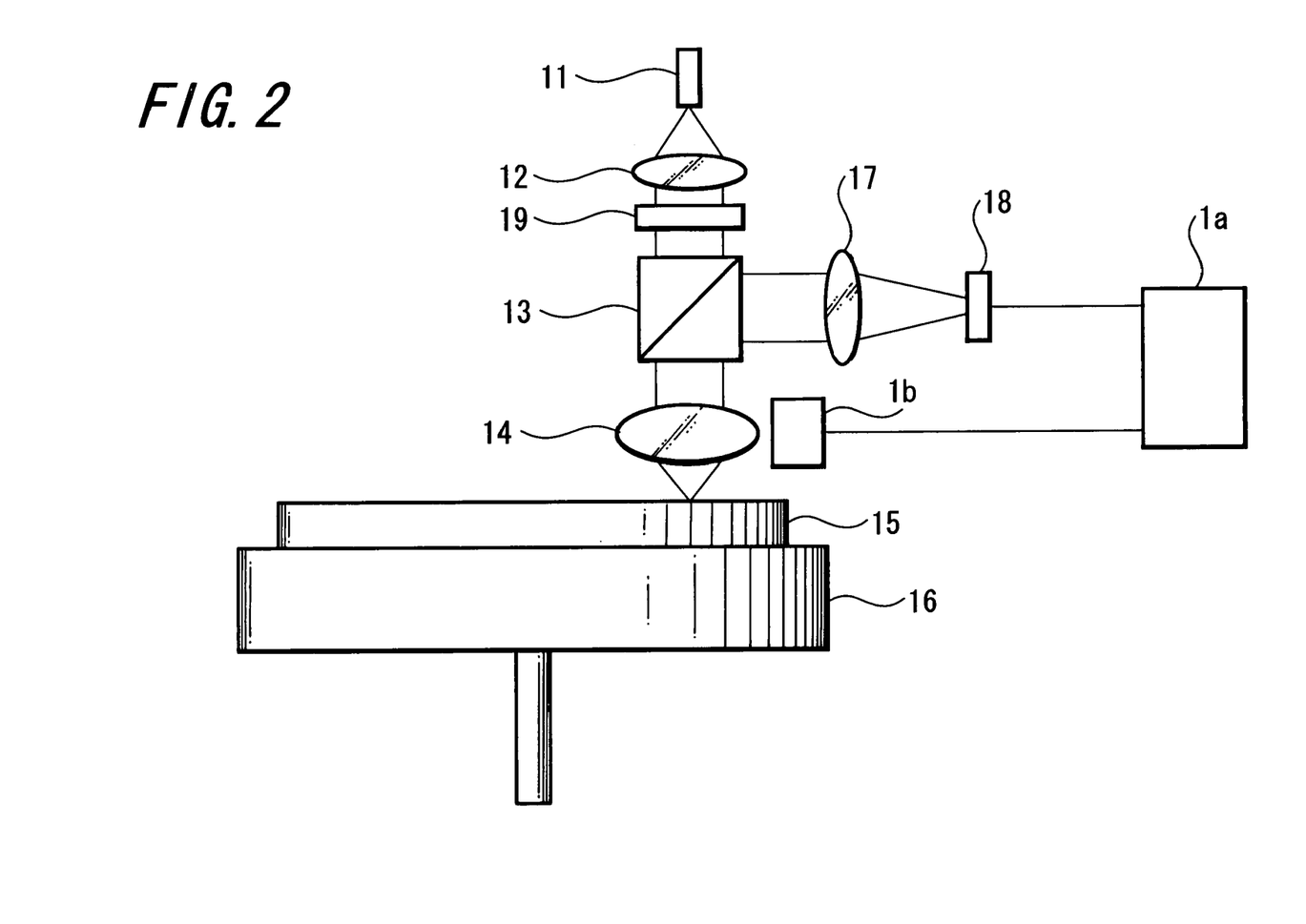
FIG. 2 is a diagram schematically showing an exposing apparatus used in an exposing process of a resist layer to which the present invention is applied.

FIG. 2 shows a structure of the exposing apparatus used in the resist exposing process. This apparatus is provided with a beam source 11 which generates light to expose the resist layer and light for evaluation, for example, laser light, and the laser light output from the beam source is focused and irradiated on a resist layer of a resist substrate 15 (reference numeral 102 in FIG. 1B), in which formation of the resist layer is completed, disposed on a turntable 16, through a collimator lens 12, grating 19, beam splitter 13 and objective lens 14.

This exposing apparatus has a structure in which light reflected from the resist substrate 15 is focused on a divided photodetector 18 through the beam splitter 13 and a condenser lens 17. The divided photodetector 18 detects the light reflected from the resist substrate 15 and outputs an electric signal corresponding to the amount of the reflected light. An arithmetic and control circuit 1a generates a focus error signal based on an output signal from the dividing detector 18 to thereby control a focus actuator 1b such that a position of the objective lens 14 is controlled to be a position corresponding to a target value (focus bias voltage value), and the position of the objective lens 14 with respect to the resist substrate 15 (focus position) is kept constant. Accordingly, even if the height of the resist substrate 15 is changed at a time of a recording exposure and at a time of an evaluation, the position of the objective lens 14 with respect to the resist substrate 15 is elaborately adjusted by the above described control system so that the position of the objective lens 14 is constantly maintained. Also, the position of the objective lens 14 with respect to the resist substrate 15 (focus position) can be changed by altering settings of the target value (focus bias voltage value).

Moreover, in this exposing apparatus, when the evaluation laser light is irradiated on the resist substrate (exposed master 103 in FIG. 1C) after the exposing process with respect to the resist substrate 15 (102), an RF (high frequency wave) signal pattern is generated in the arithmetic and control circuit 1a from an output signal of the divided photodetector 18 and the RF signal pattern is input into a measurement apparatus 1c so that the jitter and the modulation degree of a recording signal at the exposed portion can be measured.

In addition, the turntable 16 is provided with a feed mechanism (not shown in the diagram), so that the exposed position of the resist substrate 15 can be changed accurately.

Further, in this exposing apparatus, a laser drive circuit (not shown in the diagram) performs an exposure based on a data signal and a signal of reflected light amount, while controlling the beam source 11. Furthermore, a central axis of the turntable 16 is provided with a spindle motor control system to set optimum spindle rotations and control the spindle motor based on a radial position and a desired linear velocity of an optical system.

When exposing the resist layer for recording, first the resist substrate 15 is set on the turntable 16 of the exposing apparatus shown in FIG. 2 such that a film formation surface of the resist is disposed upward.

Subsequently, while irradiating the laser light from the beam source 11 on the resist layer of the resist substrate 15 and also rotating the turntable 16 so that the resist substrate 15 mounted thereon is rotated, a spiral or concentric signal pattern from an inner circumference portion to an outer circumference portion or from the outer circumference portion to the inner circumference portion on a main surface of the resist substrate 15 is recorded on the resist layer, that is, a pattern exposure is performed, by moving the resist substrate in the radial direction together with the turntable 16. Specifically, when a light intensity of a beam spot condensed on the resist substrate 15 is more than a certain degree, a change in chemical state occurs in the inorganic resist material on the resist substrate 15 so that a recording mark can be formed, and therefore, in an actual exposure an amount of light emitted from the beam source 11 is changed in accordance with a signal pattern for recording to form a pattern of the recording mark of the resist layer, so that a signal can be record.

[Signal Characteristic of Reflected Light in the Exposed Master]

As described above, a chemical state of an area where signal recording has been performed in the inorganic resist layer is changed from the original chemical state (amorphous) of the inorganic resist material to be a different chemical state (crystal).

According to the present invention, using the fact that there occurs a difference in reflectance of light such as laser light due to the difference in the state thereof, a signal is taken out of the exposed master 103 which is obtained in FIG. 1C, in the same manner as a signal is taken out from an optical disc by an optical pickup, and a jitter value or a modulation degree of a recording signal of the exposed master 103 is obtained from the signal. Specifically, the difference in reflectance occurs between the areas with and without an exposure due to the change of a chemical state of the exposed portion and when evaluation laser light is irradiated thereon, a change in an amount of reflected light occurs from a diffraction phenomenon generated due to the difference in reflectance, an RF signal pattern can be obtained and furthermore, the jitter value and the modulation degree can be obtained from the RF signal pattern thereof.

Specifically, while laser light having lower power than that for exposure is irradiated from the beam source 11 to the resist substrate (in this case, the exposed substrate 103), the resist substrate 15 (103) mounted on the turntable 16 is rotated and moved therewith in the radial direction, so that the exposed portion is relatively scanned and irradiated with the laser light. At that time, the irradiated laser light is reflected by the resist layer and the reflected light is detected by the photodetector 18 through the beam splitter 13 and the condenser lens 17 of the exposing apparatus. The RF signal pattern is taken out from the signal detected by the photodetector 18, and the jitter value or the modulation degree can be obtained from the RF signal pattern.

Figure 3:
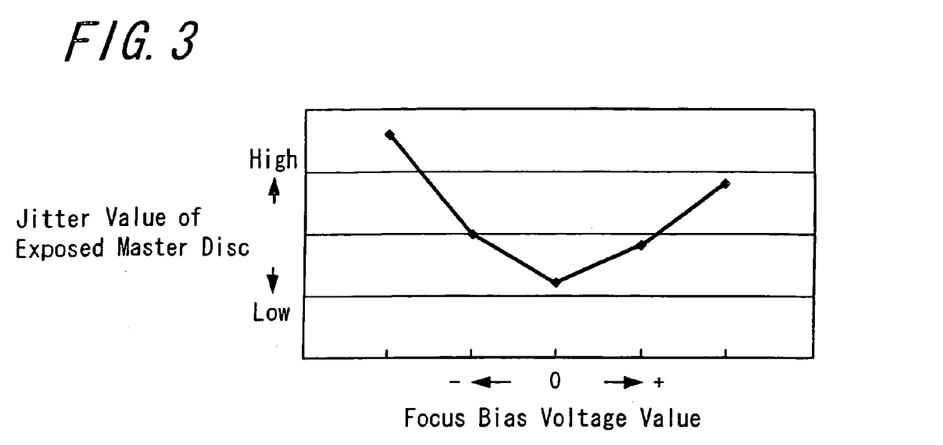
FIG. 3 is a graph showing a relationship between a focus bias voltage value and a jitter value of an evaluation signal of an exposed master at a time of exposure in the method for adjusting the exposure focusing position according to the present invention.

FIG. 3 shows a measurement result of a relationship between a focus bias voltage value, that is, an exposure focusing position, and a jitter value. Specifically, the exposed master 103 is made by exposing the resist substrate 102 with the exposure focusing position changed, the above described RF signal pattern of each of the exposure focusing positions of the exposed master 103 is taken out, and the measured results of the jitter value from the RF signal pattern are plotted. Hereupon, the above described exposed master 103 is made with laser light having 405 nm in wavelength on the resist substrate 102 in which the resist layer 101 using an incomplete oxide composed of a trivalent W and a trivalent Mo as a resist material is formed on the substrate 100 made of a silicon substrate. Also, the recording and the evaluation thereof in this case are performed under a condition that a diameter of a beam spot of the recording laser light and a diameter of a beam spot of the evaluation laser light are made into the same diameter.

According to FIG. 3, it is recognized that when the focus bias voltage value, that is, the exposure focusing position, is changed, there exists the exposure focusing position where the jitter value becomes the minimum. The focus bias voltage value is shown with setting the focus bias voltage value, where the jitter value becomes the minimum, to 0 (zero) for convenience, and a relative value of an adjusting dial scale in the plus (+) direction and a minus (−) direction therefrom.

In evaluating the exposed master 103, when the focus bias voltage value, that is, the exposure focusing position is made into the one having the minimum jitter value, a focal point of the recording laser light is best adjusted on the resist layer, which means that a quality of a light spot is considered to be best.

Figure 4:
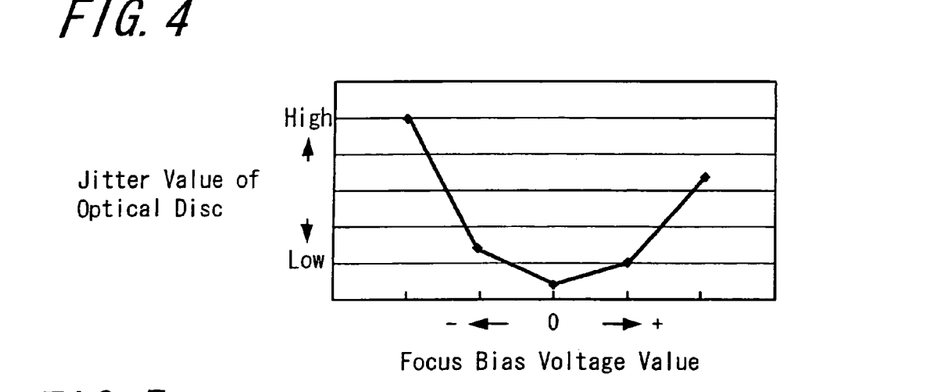
FIG. 4 is a graph showing a relationship between the focus bias voltage value and a jitter value of a reproduction signal of an optical disc at the time of exposure in the method for adjusting the exposure focusing position according to the present invention.

Next, using the exposed master 103 having the characteristic of FIG. 3, the optical disc 300 is produced in accordance with the manufacturing process explained in FIG. 1, and a jitter value of a reproduction signal from this disc is measured. The result of this measurement is shown in FIG. 4. Similar tendency to FIG. 3 is recognized also in FIG. 4, in which there exists the exposure focusing position having the minimum jitter value between the focus bias voltage value at the time of exposure (exposure focusing position) and the jitter value at the time of reproducing the optical disc, and the focus bias voltage value has been the same as that where the jitter value becomes the minimum in FIG. 3.

Therefore, at a stage before development, it is possible to presume, from the jitter value of the exposed master, a jitter value of a recording signal of an optical disc which is produced from the master. In other words, if exposing is performed at the exposure focusing position where a jitter value of the exposed master 103 becomes the minimum, it is possible to produce the optical disc 300 having an excellent signal characteristic with the minimum jitter value. In this case, it is premised that a manufacturing condition after the development process of the resist layer is the same, or the like.

Figure 5:
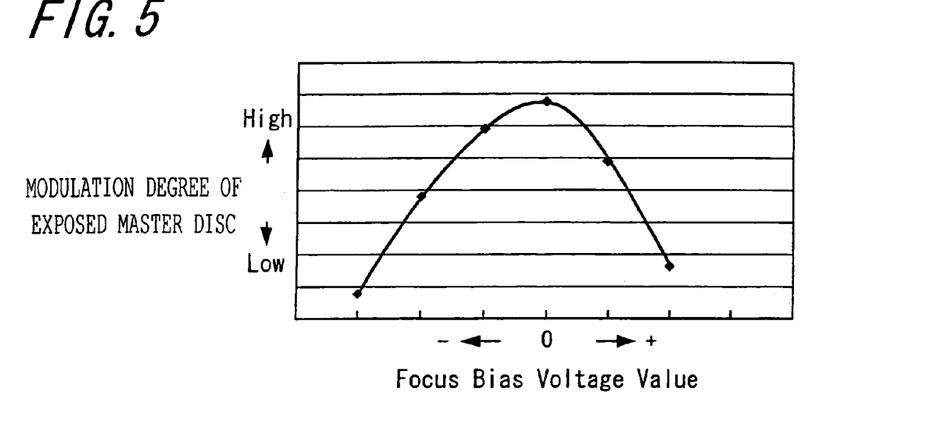
FIG. 5 is a graph showing a relationship between the focus bias voltage value and a modulation degree of the evaluation signal of the exposed master at the time of exposure in the method for adjusting the exposure focusing position according to the present invention.

Further, from the RF signal pattern of the exposed master for the optical disc a modulation degree indicating an extent of diffraction of reflected light of the exposed portion is obtained, and the exposure focusing position can be adjusted from the modulation degree. That is, as shown in FIG. 5, there exists the focus bias voltage value at the time of exposure (exposure focusing position) in which the modulation degree of the exposed master 103 becomes the maximum, and the focus bias voltage value, in which the jitter value of the optical disc 300 produced in accordance with the manufacturing process in FIG. 1 using the exposed master 103 made in FIG. 5 becomes the minimum at the time of reproduction has been the same as the focus bias voltage value in which the modulation degree becomes the maximum in FIG. 5.

Based on this relationship, if the exposure is performed at the exposure focusing position where the modulation degree of the exposed master 103 becomes the maximum, the optical disc 300 having the excellent signal characteristic with the minimum jitter value can be obtained.

[Method for Adjusting the Exposure Focusing Position]

The method for adjusting the exposure focusing position according to the present invention is a method to be performed at the stage of the exposing process in FIG. 1C, in which based on an evaluation result of a signal taken out from the exposed master 103 in the same manner as taking out a signal from an optical disc by an optical pickup the adjustment is performed using a difference in reflectance of light such as laser light due to the difference in chemical state of the inorganic resist material in this exposing process.

Hereinafter, an embodiment of the method for adjusting the exposure focusing position is explained.

In the exposing process of the resist layer in FIG. 1C, a portion such as an inner circumference portion or an outer circumference portion on the main plane of the resist substrate 15 (102) which does not serve as a recording area of an optical disc (a portion not used as a disc standard and hereinafter referred to as a trial exposure portion) is irradiated as a trial exposure with laser light of recording power, while the resist substrate 15 before the exposure (resist substrate 102) is set on the turntable 16 of the exposing apparatus in FIG. 2 such that the film formation surface of the resist layer is disposed upward (S1). Specifically, while the recording laser light is irradiated from the beam source 11 on the resist substrate 15 and the turntable 16 rotates the resist substrate 15 mounted thereon, the trial exposure portion is exposed by moving the resist substrate with the turntable 16 in the radial direction.

At this time, the recording laser light is irradiated while the exposure focusing position is shifted by changing the focus bias value. On this occasion, in the incomplete oxide of transition metals of the resist layer 101, the chemical characteristic changes in an area irradiated with the recording laser light.

Then, a trial exposure portion is irradiated with evaluation laser light (S2).

Here, the rotation of the turntable 16 and the movement in the radial direction are similar to those in step S1, in which the focus position of the evaluation laser light is fixed and the power thereof that is made to approximately one thirties of that at the time of exposure is irradiated on the trial exposure portion.

Laser light irradiated at step S2 is reflected by the resist layer and is detected by the photodetector 18 through the beam splitter 13 and condenser lens 17 of the exposing apparatus (S3).

Since the signal detected by the photodetector 18 is correlated with the reflectance of the resist layer 101, an RF signal pattern is taken out from the detected signal in the arithmetic and control circuit 1a (S4).

Subsequently, a jitter value or modulation degree is detected from the RF signal pattern for each of exposure focusing positions changed at the time of trial exposure, and the exposure focusing position having the minimum jitter value in case of evaluating the jitter value, or the exposure focusing position having the maximum modulation degree in case of evaluating the modulation degree is determined as the exposure focusing position for actual recording (S5).

The exposure focusing position determined at step S5 is irradiated with laser light having a predetermined recording power, so that a selective exposure corresponding to the recording signal pattern is performed to expose the resist layer (S6).

By this method, the jitter value of the recording signal of the optical disc can be fallen within the standard range with high accuracy.

Further, the exposure control method and exposure evaluation method according to the present invention can also be applied to a method of exposing the above inorganic resist material with combined light of laser light and light of a mercury lamp. For example, such combination is conceivable, in which a red semiconductor laser having wavelength of 660 nm and an exposure by the mercury lamp having peaks around wavelengths of 185 nm, 254 nm and 405 nm are combined.

[Practice Example]

According to the method of making the master for manufacturing the optical disc and the manufacturing method of the optical disc of the present invention, the resist substrate 102 was actually made using the incomplete oxide composed of a trivalent W and a trivalent Mo as the resist material to ultimately manufacture the optical disc 300. Hereunder, this practice example is explained in detail by referring to the above described FIG. 1.

In this example, the substrate 100 made of a silicon wafer was prepared (FIG. 1A). The intermediate layer 110 made of an amorphous silicon having a film thickness of 80 nm was uniformly formed on the substrate 100 by a sputtering method, and then the resist layer 101 made of incomplete oxide of W and Mo was uniformly formed as a film thereon by a sputtering method to make the resist substrate 102 (FIG. 1B). At this time, the sputtering was performed in an argon atmosphere using a sputter target made of incomplete oxide of W and Mo. Then, when a deposited resist layer was analyzed using an EDX (Energy Dispersive X-ray Spectrometer), an ratio of W and Mo in the incomplete oxide of W and Mo formed as the film was 80:20 and a content of oxygen was 60 atom %. Also, the film thickness of the resist layer was 55 nm. Note that from the result of analysis of electron diffraction by a transmissive electron microscope, the state of crystal of incomplete oxide WMoO before exposure was confirmed to be amorphous.

As described above, the resist substrate 102, in which the film formation of the resist layer 101 was completed, was mounted on the turntable 16 of the exposing apparatus explained in FIG. 2 and the above mentioned method for adjusting the exposure focusing position was performed. Specifically, while rotating the turntable 16 at desired rotations, a portion of the optical disc which does not serve as a recording area (a portion not used as a disc standard) such as the inner circumference portion or the outer circumference portion on the main plane of the resist substrate 102 was irradiated with the recording laser light with altering the focus bias voltage value to perform the trial exposure, and subsequently the exposed portion was irradiated with laser light for the evaluation to take out the RF signal pattern and the jitter value thereof was evaluated.

The exposure condition at that time is shown below.

Exposing wavelength: 405 nm
Numerical aperture NA of exposing optical system: 0.95
Linear velocity at the time of exposure: 4.92 m/s
Write-in system: simplified write-in system similar to a phase change disc
Recording laser light power: 13 mW
Evaluation laser light Power: 0.2 mW The focus bias voltage value in which the jitter value becomes the minimum was selected as the evaluation result of the signal of the trial exposure portion, which was set as the focus bias voltage value for the exposure of an actual exposure. With this setting, a position of the objective lens 14 in the vertical direction was shifted and adjusted by the focus actuator so as to focus the recording laser light on the resist layer.

Then, in the state where the optical system was fixed, the turntable 16 was moved to a desired radial position by the feed mechanism provided with the above described turntable 16, and a surface of the resist layer was irradiated with the recording laser light under the above described exposure condition to expose the resist layer. Further, at this time the exposure was performed while continuously moving the turntable by a slight distance in the radial direction of the resist substrate with keeping the turntable rotated.

After the above described exposure, predetermined development, electroforming, injection molding and formation of reflective and protective films were performed and the optical disc 300 having a diameter of 12 cm was obtained. Note that a conventionally known technology was used as a process of obtaining the optical disc from the above exposed master. In the optical disc thus obtained, a pit having a length of 130 nm, a linear pit having a width of 149 nm and the like are being formed corresponding to an actual signal pattern, and it is confirmed to be an optical disc having a recording capacity of 25 GB.

Next, the above optical disc was read under the following condition, and the RF signal thereof was obtained as an eye pattern so as to perform a signal evaluation.

Tracking servo: push-pull method
Read linear velocity: 4.92 m/s
Read irradiation power: 0.4 mW As a result of the signal evaluation, the jitter value was 8.0% in the eye pattern on which conventional equalization processing was performed with respect to the eye pattern read out as it was, and the jitter value was 4.6% in the eye pattern on which limit equalization processing was performed, both of which have been sufficiently low values. In other words, it is confirmed that according to the present invention a favorable optical disc, which has no difficulty in practical use, of a ROM disc having the recording capacity of 25 GB can be obtained.

As heretofore described, according to the method of the present invention, at the stage of the exposing process, whether a final product to be manufactured with the exposure focusing position is good or not good can be judged based upon the recording signal characteristic (jitter value or modulation degree) of the exposed portion immediately after the trial exposure which is performed before the exposure processing, and therefore the exposure focusing position for an actual exposure can be appropriately decided immediately from that result.

Further, at the stage immediately before the exposure processing of the exposing process, whether the final product to be manufactured under the condition of an exposure focusing position is good or not good can be judged in the area where the quality of the optical disc is not affected, and therefore even when the judgment result is NG, an evaluation can again be performed immediately to correct the exposure focusing position.

Accordingly, problems occurred in conventional methods, such as an amount of defective products, and wasted time and labor, which occurs when an adjustment of an exposure condition of a manufacturing process or the like is made by judging whether good or not good at a final stage, that is, by measuring a characteristic of a manufactured optical disc, can be improved, and therefore an improvement in productivity can be achieved.

The invention claimed is:

1. A method of making a master for manufacturing an optical disc, comprising:

exposing an inorganic resist layer, said inorganic resist layer including an incomplete oxide of tungsten and molybdenum in a ratio of 80 to 20 and including 60 percent atomic oxygen, formed on a substrate to recording laser light modulated by an information signal corresponding to an information signal of an information concave and convex pattern formed on said optical disc to form an exposed pattern corresponding to said information concave and convex pattern of said optical disc, and performing development processing on said inorganic resist layer to form a concave and convex pattern corresponding to said information concave and convex pattern of said inorganic resist layer, wherein a trial exposure is performed on a non-recording area of said resist layer, evaluation laser light is irradiated on the non-recording area of said resist layer to evaluate a recording signal characteristic of said resist layer from the reflected light, and based on an evaluation result, an adjustment of an exposure focusing position is performed to determine an optimum focus position of recording laser light which is later performed.

2. The method of making a master for manufacturing an optical disc according to claim 1, wherein an area irradiated with said evaluation laser light is an area other than an area irradiated with said recording laser light and is an inner circumference portion or an outer circumference portion of the optical disc.

3. A method of manufacturing an optical disc comprising:
making a master for manufacturing the optical disc;
making a stamper for manufacturing the optical disc from said master through transcription;
manufacturing an optical disc substrate using said stamper through transcription;
forming a reflective film on the optical disc substrate; and
forming a protective film, wherein making a master for manufacturing the optical disc includes:

exposing an inorganic resist layer, said inorganic resist layer including an incomplete oxide of tungsten and molybdenum in a ratio of 80 to 20 and including 60 percent atomic oxygen, formed on the substrate to recording laser light modulated by an information signal corresponding to an information signal of an information concave and convex pattern formed on said optical disc to form an exposed pattern corresponding to said information concave and convex pattern on said optical disc, and performing development processing on said inorganic resist layer to form a concave and convex pattern corresponding to said information concave and convex pattern of said inorganic resist layer, wherein a trial exposure is performed on a non-recording area of said resist layer, evaluation laser light is irradiated on the non-recording area of said resist layer to evaluate a recording signal characteristic of said resist layer from the reflected light, and based on an evaluation result an adjustment of exposure focusing position is performed to determine an optimum focus position of recording laser light which is later performed.

4. The method of manufacturing the optical disc according to claim 3, wherein an area irradiated with said evaluation laser light is an area other than an area irradiated with said recording laser light and is an inner circumference portion or an outer circumference portion of the optical disc.

* * * * *